United States Patent
Tackett et al.

[11] Patent Number: 6,065,734
[45] Date of Patent: May 23, 2000

[54] CONTROL VALVE FOR A HYDRAULIC CONTROL UNIT OF VEHICULAR BRAKE SYSTEMS

[75] Inventors: Wendell D. Tackett, Ann Arbor; Herbert L. Linkner, Jr., Dexter, both of Mich.

[73] Assignee: Kelsey-Hayes Company, Livonia, Mich.

[21] Appl. No.: 09/165,610

[22] Filed: Oct. 2, 1998

Related U.S. Application Data

[60] Provisional application No. 60/060,908, Oct. 3, 1997.

[51] Int. Cl.[7] .................................. B60T 8/36; F16K 31/06
[52] U.S. Cl. .................................. 251/129.02; 251/129.15; 251/64; 303/119.2
[58] Field of Search ........................ 251/64, 129.02, 251/129.15, 129.07; 303/119.1, 119.2

[56] References Cited

U.S. PATENT DOCUMENTS

| | | |
|---|---|---|
| 4,004,343 | 1/1977 | Marsden . |
| 4,896,860 | 1/1990 | Malone et al. . |
| 5,237,980 | 8/1993 | Gillier ........................................ 123/520 |
| 5,396,926 | 3/1995 | Pataki et al. ........................ 137/596.17 |
| 5,503,366 | 4/1996 | Zabeck et al. ...................... 251/129.18 |
| 5,553,829 | 9/1996 | Hemsen ................................. 251/64 X |
| 5,577,534 | 11/1996 | Ward .................................. 137/596.17 |
| 5,584,466 | 12/1996 | Fukano et al. ............................. 251/65 |
| 5,627,504 | 5/1997 | Kleinhappl .............................. 335/230 |
| 5,918,818 | 7/1999 | Takeda ................................. 239/585.1 |
| 5,934,767 | 8/1999 | Schmidt et al. ..................... 303/119.2 |
| 5,937,884 | 8/1999 | Barnoin et al. ........................ 251/64 X |

FOREIGN PATENT DOCUMENTS 44 31 457   3/1976   Germany .

*Primary Examiner*—John Rivell
*Assistant Examiner*—Meredith H. Schoenfeld
*Attorney, Agent, or Firm*—MacMillan, Sobanski & Todd, LLC; A. Michael Tucker

[57] ABSTRACT

A control valve for controlling fluid flow in a hydraulic control unit of a vehicular brake system includes a valve body. A flux tube is mounted on the valve body. An armature core having first and second ends and a longitudinal passage is slidably received in the flux tube. A bearing element is formed from a low-friction material. The bearing element includes a stem received into the longitudinal passage and an end cap having a diameter greater than a diameter of the armature core.

18 Claims, 4 Drawing Sheets

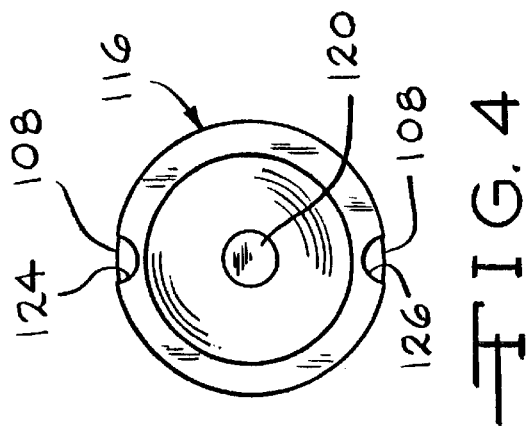
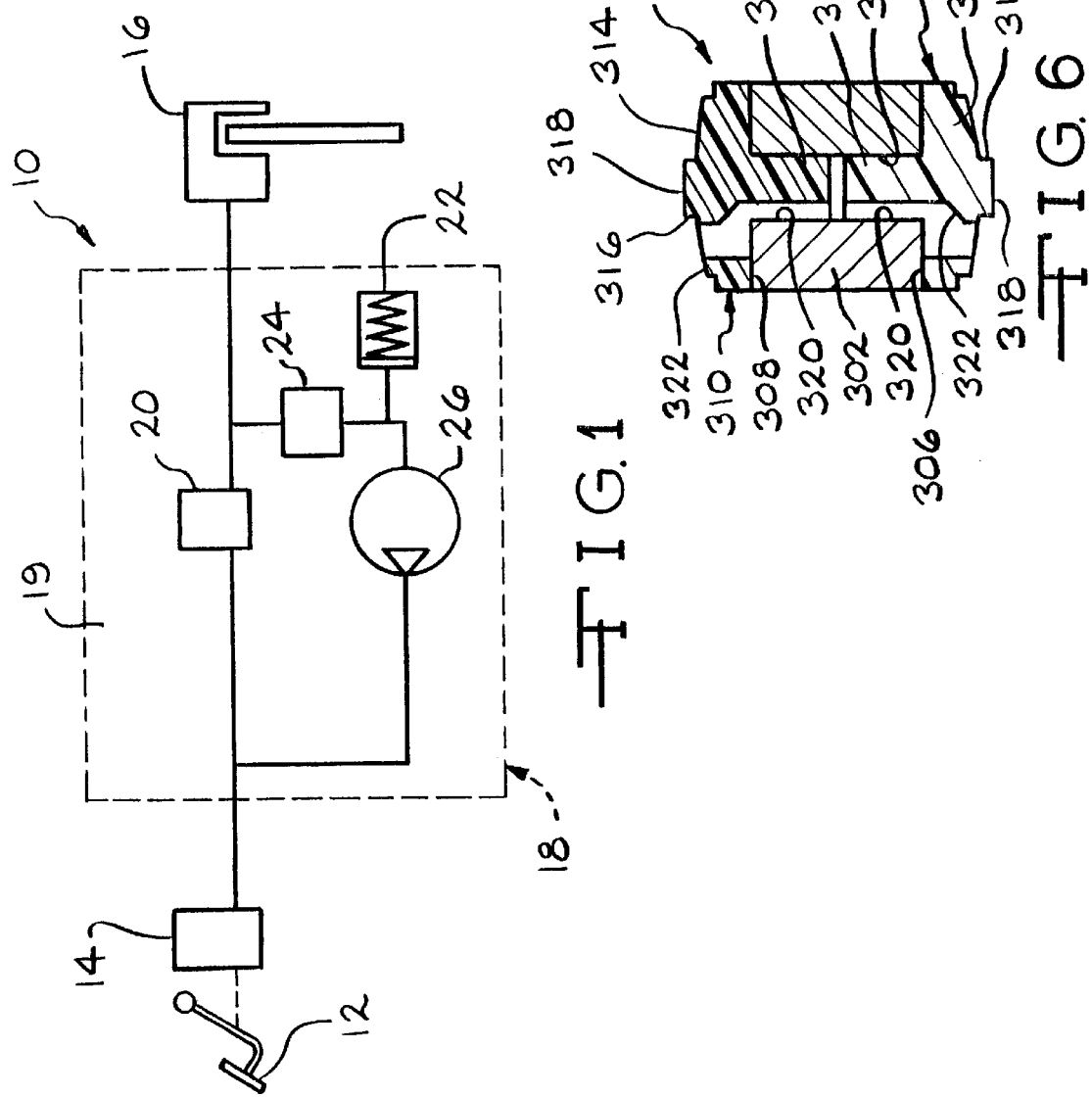

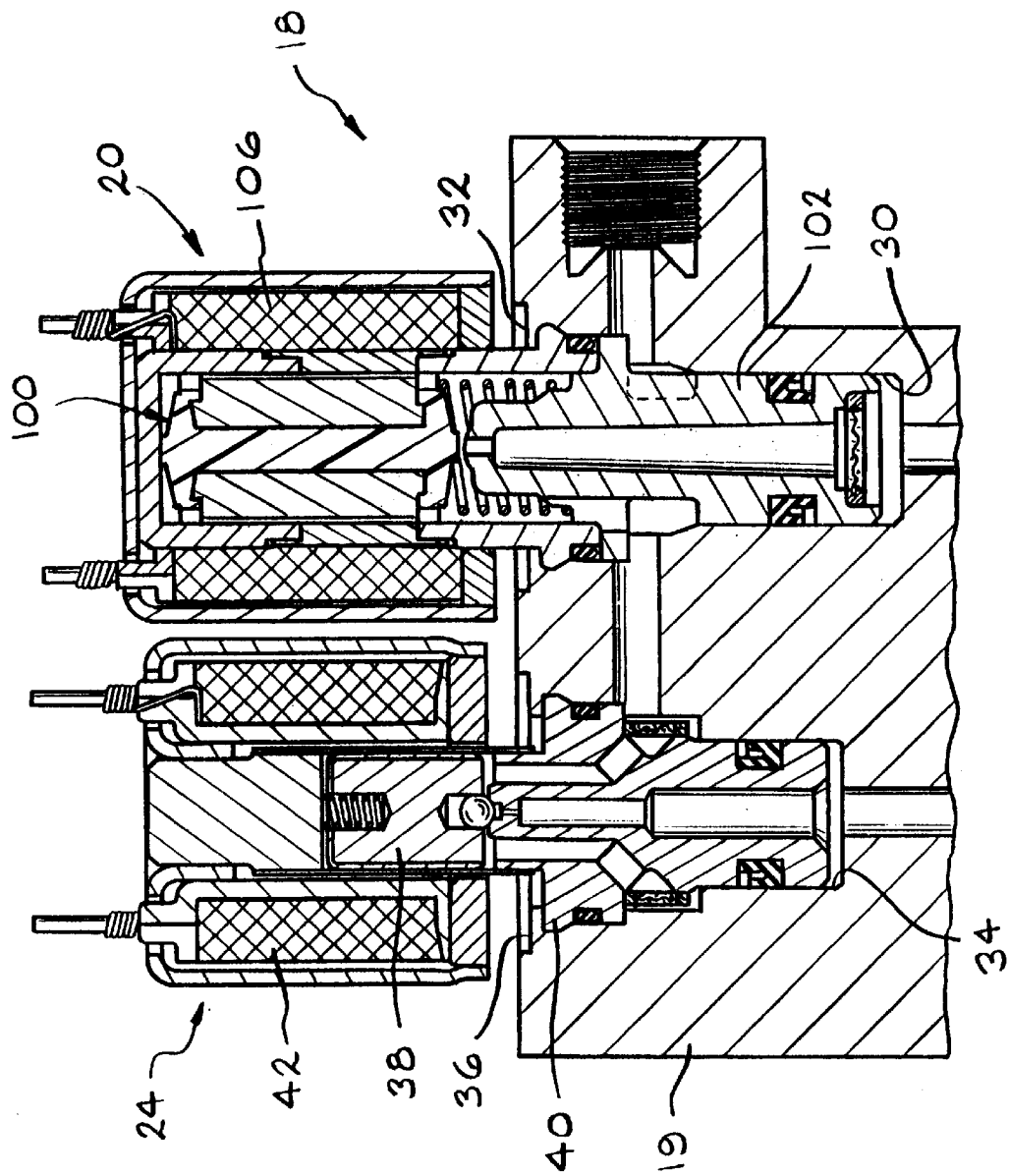

CONTROL VALVE FOR A HYDRAULIC CONTROL UNIT OF VEHICULAR BRAKE SYSTEMS

CROSS-REFERENCE TO RELATED APPLICATION

This invention claims the benefit of U.S. provisional patent application identified as Application Number 60/060,908, filed Oct. 3, 1997.

BACKGROUND OF THE INVENTION

This invention relates in general to vehicular brake systems, and in particular is concerned with a control valve mounted in a hydraulic control unit of an electronically controlled brake system.

Electronically-controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a flux tube or sleeve for movement relative to a valve body. A spring may be used to bias the armature in an open or closed position, thereby permitting or blocking fluid flow through the valve, respectively. A coil subassembly is provided about the flux tube. When the valve is energized, an electromagnetic flux generated by the coil subassembly slides the armature from the biased open or closed position to a closed or open position, respectively.

Control valves mounted in a HCU are actuated by an electronic control module to provide desired braking functions such as anti-lock braking, traction control, and vehicle stability control.

It is desirable that a control valve provides fluid control in a manner proportional to the amount of current applied to the coil subassembly. Such proportional control valves result in enhanced performance of an electronically controlled brake system.

SUMMARY OF THE INVENTION

This invention relates to a proportional control valve mounted in a hydraulic control unit of a vehicular brake system. The control valve includes a symetrically-formed armature slidably received in a flux tube. The armature slides in the flux tube toward a valve body in proportion to the amount of current applied to a coil assembly. End caps formed from a low friction material reduce lateral friction between the armature and the flux tube and resulting hysteresis, noise and vibration of the control valve. The control valve is economical to manufacture and relative easy to assembly.

In a preferred embodiment, a control valve for controlling fluid flow in a hydraulic control unit of a vehicular brake system includes a valve body. A flux tube is mounted on the valve body. An armature core having first and second ends and a longitudinal passage is slidably received in the flux tube. A bearing element is formed from a low-friction material. The bearing element includes a stem received into the longitudinal passage and an end cap having a diameter greater than a diameter of the armature core.

This control valve is particularly adapted to be mounted in a bore of a housing of a hydraulic control unit of an electronically controlled vehicular brake system.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic diagram of a vehicular braking system according to the present invention illustrating a hydraulic control unit including a normally open control valve, a normally closed control valve, an accumulator, and a pump.

FIG. 2 is a sectional view through the hydraulic control unit of FIG. 1 illustrating the normally open control valve and the normally closed control valve according to this invention.

FIG. 4 is an end view of an armature removed from the normally open control valve of FIG. 3 for clarity of illustration.

FIG. 6 is an enlarged sectional view of a third embodiment of an armature for a control valve according to this invention illustrating a central fluid passage, wherein the armature is removed from a control valve for clarity of illustration.

DETAILED DESCRIPTION OF THE PREFERRED EMBODIMENTS

Figure 3:
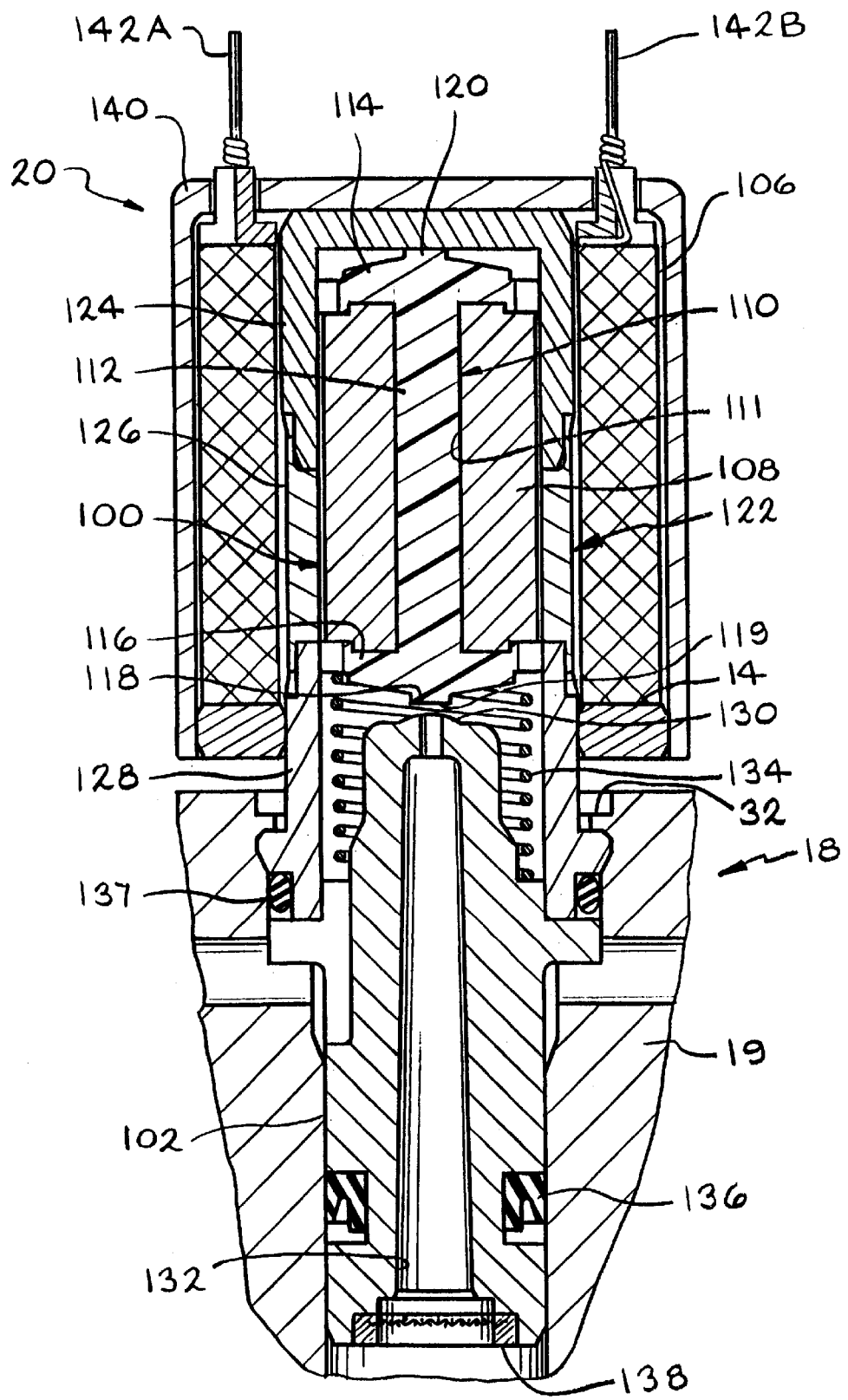
FIG. 3 is an enlarged sectional view of the normally open control valve of FIG. 2.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 connected between the low pressure accumulator 22 and an inlet to control valve 20. The HCU 18 may also include other fluid flow devices such as an attenuator (not illustrated), depending upon the system design. Control valve 20 is preferably formed as a proportional solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

A sectional view of the isolation valve 20 and the dump valve 24 mounted on the housing 19 is illustrated in FIG. 2. The isolation valve 20 is received in a bore 30 formed in the housing 19 and retained by an annular lip 32 formed by any desired means. As described below in detail, the isolation valve 20 includes an armature 100 biased away from a valve body 102 when the valve 20 is not energized. When a coil 106 is energized to produce an electromagnetic flux, the armature 100 is pulled downwardly to close fluid flow through the valve 20.

The dump valve 24 is received in a bore 34 formed in the housing 19 and retained by an annular lip 36 formed by any desired means. The dump valve 24 includes an armature 38 biased against a valve body 40 when the valve 24 is not energized. When a coil 42 is energized to produce an electromagnetic flux, the armature 38 is pulled upwardly to open fluid flow through the valve 24.

Details of the isolation valve 20 are illustrated best in FIGS. 2, 3 and 4. As stated above, isolation valve 20 includes an armature 100. The armature 100 is formed as a subassembly and then assembled with the balance of the valve 20. The armature 100 includes a cylindrical armature core 108 and an bearing element 110. The armature core 108 is preferably formed from a ferromagnetic material such as iron that is responsive to the electromagnetic flux created by the energized coil 106.

The bearing element 110 is preferably formed from a moldable material The material is received in a longitudinal (preferably axial) passage 111 of the armature core 108 to solidify and form a cylindrical stem 112. The moldable material is formed over each end of the armature core 108 to solidify and form end caps 114 and 116. The outer diameter of each end cap 114 and 116 is preferably greater than the outer diameter of the armature core 108. Preferably, the bearing element 110 is formed from a low-friction material. Suitable materials include moldable plastics such as polypthalamide (PPA) 1145 HS available from Amoco and polyphenylene sulfide available from Phillips under the name Ryton R4XT.

Preferably, a lower surface of end cap 116 includes a downwardly projecting stub 118. A planar surface 119 of stub 118 acts as a valve sealing element and engages the valve body 102 when the armature 100 moves downwardly. This type of valve element is resistant to contamination that may be present in the brake fluid.

To reduce assembly costs and time, each of the end caps 114 and 116 can be formed identical, so that end cap 116 has an outwardly projecting stub 120. Such a construction results in an armature 100 which is symmetrical and can be received in a flux tube or sleeve 122 without specific orientation. In other words, the armature 100 is inserted into the flux tube 122 without having to be oriented in a particular direction (e.g., top v. bottom).

Each of the end caps 114 and 116 also preferably includes voids 124 and 126 illustrated in FIG. 4. Voids 124 and 126 permit fluid to pass around the armature 100 as it moves in response to operation of the valve 20.

As stated above, the outer diameter of each end cap 114 and 116 is greater than the outer diameter of the armature core 108. Each end cap 114 and 116 acts as a bearing against the inner surface of the flux tube 122. In other words, each end cap acts as a glide ring as the armature 100 reciprocates. The end caps 114 and 116 maintain a lateral clearance between the outer diameter of the sleeve 108 and the inner surface of the flux tube 122. The concentricity of the armature core 108 within the flux tube 122 is maintained. Minor surface rust, which may collect on the outer surface of the armature core 108, should not interfere with the operation of the armature 100. The armature 100 is favorably responsive to the electromagnetic flux of the coil 106 and forms part of a constant force magnetic circuit. In such a circuit, the force, which acts against the armature 100, is a function of input current only and not a function of the distance traveled by the armature 100. Such a magnetic circuit provides desired stable and repeatable proportional control of fluid flow in control valve 20. Operation of the control valve 20 has resulted in less vibration and noise.

The flux tube 122 can be formed in three sections 124, 126, and 128. Sections 124 and 128 are formed from a ferromagnetic material and conduct the flux. Section 126 is preferably formed from a non-ferromagnetic material and does not conduct the flux. The sections 124, 126, and 128 are preferably brazed together to form a unitary flux tube 122.

The valve body 102 includes an upwardly projecting valve seat 130 which seats stub 118 as described above. An axial fluid passage 132 is formed in the valve body 102. Spring 134 is seated on the valve body 102 to bias the armature 100 away from the valve body 102. Preferably, a lip seal 136 received in a groove in the valve body 102 and an O-ring 137 provide fluid seals between the valve body 102 and the HCU 18. Preferably, a filter 138 is provided at the inlet of the fluid passage 132.

If desired, the valve body 102 can be formed from a moldable material such as plastic. A plastic valve body 102 reduces the cost of manufacture and provides non-magnetic properties.

A casing 140 receives the coil 106. Terminal ends 142A and 142B of the coil 106 project through respective openings in the casing 140 and are connected to the electronic control module. A flux ring 144 is fitted into an open end of the casing 140 to retain the coil 106. The casing 140, coil 106, and flux ring 144 are pressed onto an outer surface of the flux tube 122 and retained as desired.

Figure 5:
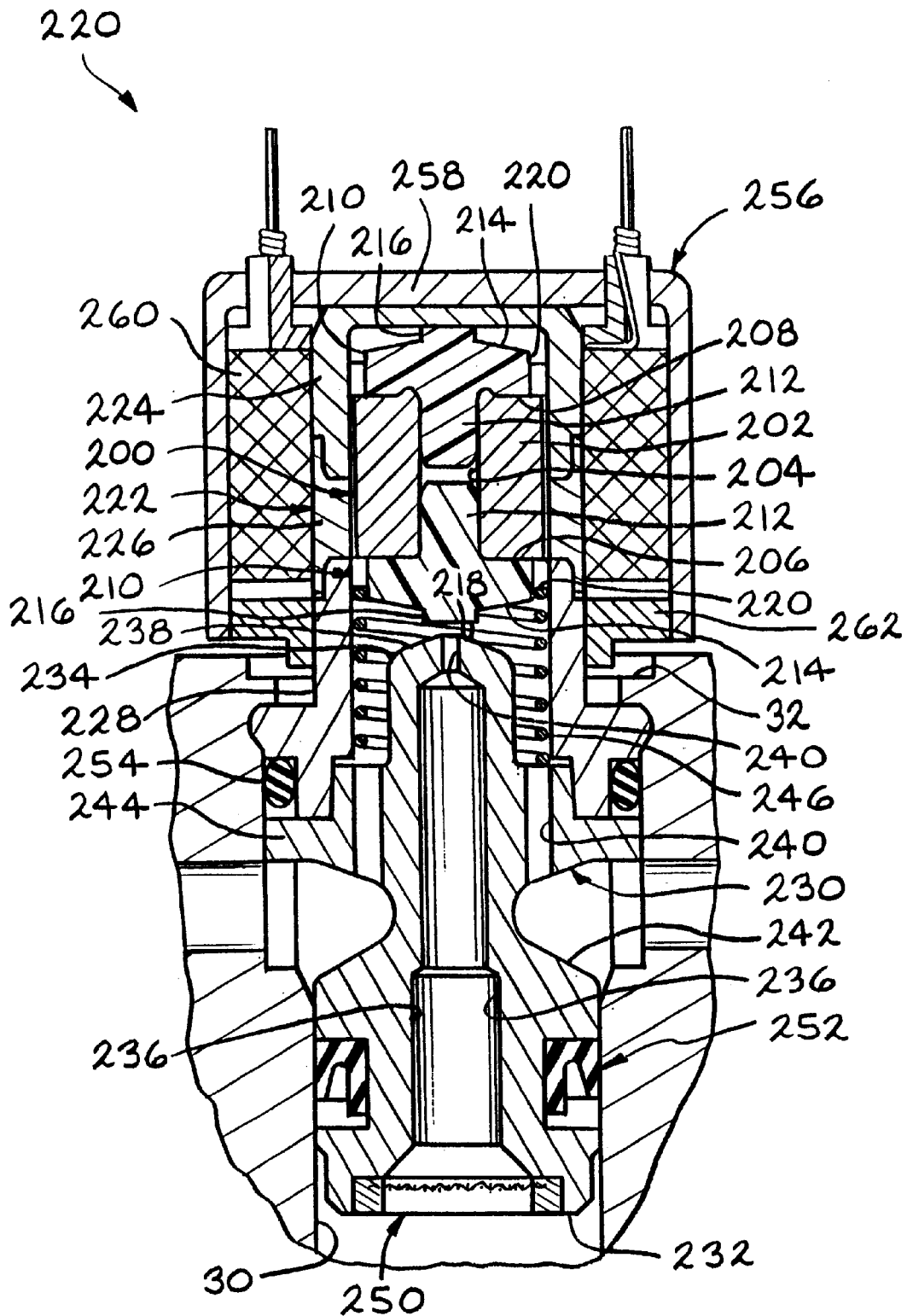
FIG. 5 is an enlarged sectional view of a second embodiment of a normally open control valve according to this invention.

A second embodiment of an isolation valve is indicated generally at 220 in FIG. 5. Isolation valve 220 includes an armature 200 formed separately and then assembled with the balance of the valve 220. The armature 200 includes an armature core 202 formed as a cylinder from a ferromagnetic material. The armature core 202 includes a longitudinal (preferably axial) passage 204 originating at a first end 206 of the armature core 202 and terminating at a second end 208 of the armature core. The longitudinal passage 204 can be formed as a bore. Preferably the longitudinal passage 204 is formed with a constant diameter.

A pair of bearing elements 210 is formed separately and then mounted on the armature core 202. Each bearing element 210 includes a preferably cylindrical stem 212 and an end cap 214. The diameter of the stem 212 is sized so that the stem 212 can be inserted into the axial passage 204 of the armature core 202. The outer diameter of an end cap 214 is greater than an outer diameter of the armature core 202. Preferably, the stem 212 and end cap 214 are integrally molded from a low-friction material. Suitable materials include moldable materials such as polypthalamide (PPA) 1145 HS available from Amoco and plyphenylene sulfide available from Phillips under the name Ryton R4XT.

Each bearing element 210 includes a projecting stub 216 on an outer surface of the end cap 214 opposite the stem 212. The stub 216 preferably terminates in a planar surface 218. Each bearing element 210 also includes an annular recess 220 formed in the outer surface at the perimeter of the end cap 214.

The bearing elements 210 are mounted on the armature core 202 as their respective stems 212 are received into the first and second ends 206,208 of the axial passage 204. Preferably, each stem 212 is pressed into the axial passage 204 and retained by an interference fit. The length of each stem 212 is sized so that the stems 212 do not contact each other when two bearing elements 210 are mounted on the armature core 202. When assembled, the armature core 202 and its bearing element 210 form a symmetrical armature 200.

The armature 200 is slidably inserted into a flux tube or sleeve 222. Since the armature 200 is symmetrical, it does not have to be oriented one way or the other prior to insertion. The outer diameter of the end caps 214 is slightly less than an inner diameter of the flux tube 222. The end caps 214 guide the armature 200 are it reciprocates within the flux tube 222 as described below. The end caps 214 also maintain an annular gap between the outer diameter of the armature core 202 and the inner diameter of the flux tube 222. This gap provides a desired magnetic gap in the electromagnetic circuit.

The flux tube 222 can be formed in three sections 224, 226, and 228. Sections 224 and 228 are formed from a ferromagnetic material and conduct magnetic flux. Section 226 is preferably formed from a non-ferromagnetic material and does not conduct magnetic flux. The sections 224,226, and 228 are preferably joined together to form a unitary flux tube 222. In other embodiments, a flux tube can be formed as a single element. In other control valves, a sleeve is used to slidably receive the armature 200.

A valve body 230 includes a first or inboard end 232 and a second or outboard end 234. The inboard end 232 is inserted and received in the bore 30 formed in the housing 19. An axial fluid conduit 236 has an inlet at the inboard end 232 and an outlet at the outboard end 234. Preferably, the outboard end 234 is formed with a projecting conical surface 238 having a reduced-diameter opening 240 aligned with the fluid conduit 236. As described below, the conical surface 238 cooperates with the planar surface 218 of the stub 216 of a bearing element 210 to form a valve seat.

A plurality of fluid outlet passages 240 are formed radially outwardly from the axial fluid conduit 236 which terminate in an annular groove 242 in the valve body 230. An annular flange 244 is formed about an upper portion of the valve body 230.

A coil spring 246 is positioned between the armature 200 and the valve body 230. An outboard end of the spring 246 is seated in the annular recess 220 of the end cap 214. An inboard end of the spring 246 is seated on a stepped portion 248 of the valve body 230. Preferably, the flux tube 222 is pressed onto the valve body 230 and retained by an interference fit, welding, etc. The flange 244 forms a shoulder for receiving an inboard surface of the flux tube 222.

A filter assembly 250 is received at the inlet of the axial fluid passage 236 to prevent debris from entering the valve 220. A lip or cup seal 252 is preferably received in an annular groove about a lower portion of the valve body 230 to prevent fluid from bypassing the axial fluid passage 236. A seal 254 is inserted between the bore 30 and the flux tube 222 to prevent fluid from escaping from the bore 30. The annular lip 32 preferably formed by swaging retains the valve is 220 in the bore 30.

A coil assembly 256 is pressed onto the flux tube 222. The coil assembly 256 includes a cup-shaped casing 258 receiving a coil 260. Terminal ends of the coil 260 extend through respective openings in the casing 258 and are electrically connected to an electronic control module. A flux ring 262 is fitted into an open end of the casing 258 to retain the coil 260. The casing 258, coil 260, and flux ring 262 are pressed onto an outer surface of the flux tube 222 and retained as desired.

When the valve 220 is not energized, the spring 246 biases the armature 200 away from the valve body 230 in an open position. The planar face 218 is spaced from the conical surface 238 so that fluid can flow from the axial passage 236 to the outlet passages 240. When the valve 220 is energized, current in the coil 260 creates an electromagnetic flux that attracts the armature 200 downwardly against the force of the spring 246. When the planar surface 218 engages the conical surface 238, the valve 220 achieves a closed position so that no fluid can flow from the axial passage 236 to the outlet passages 240. The position of the armature 200 is varied in proportion to the amount of current applied to the coil 260. Thus, the valve 220 provides proportional control in a vehicular brake system 10.

If desired, the valve body 230 can be formed from a moldable material such as plastic. A plastic valve body reduces the cost of manufacture and is not part of the magnetic circuit formed when the valve is energized. Each end cap 214 of the bearing element 210 can include voids (similar to voids 124 and 126 of valve 20) about the perimeter of the end caps 214 to provide damping as fluid travels around the armature 200 when the armature 200 is sliding in the flux tube 222.

A third embodiment of an armature according to this invention is indicated generally at 300 in FIG. 6. The armature 300 is particularly adapted to be slidably mounted in a flux tube of a solenoid valve. For purposes of simplification of illustration, the armature 300 is illustrated removed from a control valve. It is understood that the armature 300 can replace armature 200 in control valve 220 or armature 100 of control valve 20.

The armature 300 includes an armature core 302 formed as a cylinder from a ferromagnetic material. The armature core 302 includes a first end 306 and a second end 308. A longitudinal (preferably axial) passage 304 is formed in the armature 302 that extends between ends 306 and 308.

A pair of bearing elements 310 is formed separately and then mounted on the armature core 302. Each bearing element 310 includes a preferably cylindrical stem 312 and an end cap 314. When assembled, the stem 312 is inserted in the passage 304 to retain the bearing element 310 on the armature core 302. The outer diameter of the end cap is greater than an outer diameter of the armature core 302. A projecting stub 316 is formed on an outer surface of the end cap 314 opposite the stem. The stub 316 preferably terminates in a planar surface 318.

Each bearing also includes a central fluid passage 320. The central fluid passage 320 passes through the stem 312 and the end cap 314, but not through the stub 316. As illustrated, the central fluid passage 320 can include an angled section 322 so that it does not pass through the stub 316.

The armature 300 is inserted in a flux tube such as flux tube 222. Since the armature 300 is a symmetrical assembly, it does not have to be oriented a particular direction prior to insertion. When a control valve is energized and then de-energized, the armature 300 slides within the flux tube 222 as described above for armature 200. As the armature 300 slides, fluid surrounding the armature 300 may pass through the central fluid passage 320 from one end to another. Fluid traveling through the central fluid passage 320 prevents the armature 300 from being locked by hydraulic forces and also provides a dampening function to reduce noise and vibration in the control valve.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid low in a hydraulic control unit of a vehicular brake system comprising:
    a valve body;
    a flux tube mounted on the valve body;
    an armature core having first and second ends and a longitudinal passage, the armature core slidably received in the flux tube; and
    a bearing element formed from a low-friction material, the bearing element including a stem received into the longitudinal passage and an end cap having a diameter greater than a diameter of the armature core.

2. The control valve defined in claim 1 wherein the low-friction material of the bearing element is a moldable.

3. The control valve defined in claim 1 wherein the end cap maintains a gap between the armature core and the flux tube.

4. The control valve defined in claim 1 wherein the end cap includes a stub formed on an outer surface opposite the stem.

5. The control valve defined in claim 4 wherein the stub terminates in a planar surface.

6. The control valve defined in claim 5 wherein the valve body includes a surface that cooperates with the planar surface of the stub to form a valve.

7. The control valve defined in claim 1 wherein the end cap includes an annular recess formed at a perimeter of an outer surface, the recess seating one end of a spring biased between the bearing element and the valve body.

8. The control valve defined in claim 1 wherein the end cap includes at least one void formed in a perimeter of the end cap.

9. A hydraulic control unit of a vehicular brake system comprising:
    a housing;
    a bore formed in the housing;
    a valve body mounted in the bore;
    a flux tube mounted on the valve body;
    an armature core having first and second ends and a longitudinal passage, the armature core slidably received in the flux tube; and
    a first bearing element formed from a low-friction material, the first bearing element including a stem received into the first end of the longitudinal passage and an end cap having a diameter greater than a diameter of the armature core.

10. The hydraulic control unit defined in claim 9 including a second bearing element formed from a low-friction material, the second bearing element including a stem received into the second end of the longitudinal passage.

11. The hydraulic control unit defined in claim 10 wherein the first and second bearing elements are integrally molded.

12. The hydraulic control unit defined in claim 10 wherein the second bearing element includes an end cap having a diameter greater than a diameter of the armature core.

13. The hydraulic control unit defined in claim 12 wherein each of the first and second bearing elements includes a stub formed in an outer surface opposite the stem.

14. The hydraulic control unit defined in claim 13 wherein the stub formed on the first bearing element includes a planar surface cooperating with a conical surface formed on the valve body to form a valve.

15. The hydraulic control unit defined in claim 13 wherein the stub formed on the second bearing element forms a stop between the armature core and the flux tube.

16. The hydraulic control unit defined in claim 10 wherein the armature core with the first and second bearing elements mounted thereon form a symmetrical armature.

17. The hydraulic control unit defined in claim 12 wherein the end caps provide a gap between the armature core and the flux tube.

18. The hydraulic control unit defined in claim 12 wherein each bearing element includes a central fluid passage.

* * * * *